(12) United States Patent
Iwasaki

(10) Patent No.: US 8,077,409 B2
(45) Date of Patent: Dec. 13, 2011

(54) LENS DRIVING DEVICE AND IMAGE FORMING APPARATUS

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 12/546,988

(22) Filed: Aug. 25, 2009

(65) Prior Publication Data

US 2010/0053780 A1   Mar. 4, 2010

(30) Foreign Application Priority Data

Aug. 27, 2008   (JP) .................. 2008-217573

(51) Int. Cl.
*G02B 7/02* (2006.01)

(52) U.S. Cl. ...................................... 359/817

(58) Field of Classification Search .................. 359/817, 359/699, 700–704, 823, 826
See application file for complete search history.

(56) References Cited

U.S. PATENT DOCUMENTS 6,490,099 B2 * 12/2002 Sasaki ........................... 359/700

FOREIGN PATENT DOCUMENTS

| JP | 2002-90611 A | 3/2002 |
|---|---|---|
| JP | 2003-84185 A | 3/2003 |
| JP | 4070351 B2 | 1/2008 |
| JP | 4074800 B2 | 2/2008 |

\* cited by examiner

*Primary Examiner* — Scott J Sugarman
*Assistant Examiner* — Vipin Patel
(74) *Attorney, Agent, or Firm* — Dickstein Shapiro LLP

(57) ABSTRACT

A drive mechanism includes a rotational cylinder capable of moving upon the optical axis, a cam part on a fixed member and a cam follower which is formed on the rotational cylinder fitting with the cam part and has a conical portion and a cylindrical portion. The cam part includes a tapered cam groove formed such that the cylinder extends in the optical axis upon a range whereupon the cylinder moves from the collapsed state to a photography state and a planar surface formed such that the cylinder does not move upon the optical axis upon the photography range. The conical portion fits with the cam groove of the cam part upon the range whereupon the cylinder moves upon the optical axis, and the cylindrical portion fits with the planar surface of the cam part upon the range whereupon the cylinder does not move upon the optical axis.

16 Claims, 5 Drawing Sheets

LENS DRIVING DEVICE AND IMAGE FORMING APPARATUS

CROSS-REFERENCE TO THE RELATED APPLICATION

This application is based on and claims the priority benefit of Japanese Patent Application No. 2008-217573, filed on Aug. 27, 2008, the disclosure of which is incorporated herein by reference in its entirety.

BACKGROUND OF THE INVENTION

1. Field of the Invention

The present invention relates to a lens driving device and an image forming apparatus, and, more specifically to a lens driving device, which enables making a fixed cylinder provided with a cam groove, of a resin, has a high precision of a position of a lens group upon a region where photography may be performed, and prevents a malfunction from arising, such as might be caused by an impact upon the lens driving device, and an image forming apparatus including the lens driving device so configured.

2. Description of the Related Art

In recent years, it is common for a large number of photographic lenses that are employed in various types of cameras to include zoom lenses, which change positions of a plurality of lens groups when a photograph is taken, and thereby sequentially change a focal length of the photography that is performed with the camera that employs the zoom lens. In addition, it becomes mainstream to use a collapsible zoom for the photographic cameras, because these lenses are capable of achieving a greater miniaturization of the camera by collapsing the lens groups within a fixed cylinder of a lens barrel when a photograph is not being taken, and thus narrowing an interval between the respective lens groups when the photograph is not being taken. A mechanism is commonly employed as a moving device, which causes the lens groups to move upon the collapsible zoom lens, which includes a fixed cylinder and a rotational cylinder. The rotational cylinder is installed upon the fixed cylinder, in a cam engagement or helicoid engagement, so as to cause the rotational cylinder to move upon an optical axial direction.

A typical structure of the mechanism described herein includes causing the rotational cylinder to extend and retract in a line with a cam groove, while rotating with respect to the fixed cylinder, supporting a linear guide cylinder upon an interior portion of the rotational cylinder. The linear guide cylinder is capable of rotating relative to the rotational cylinder, and moves in a unified manner with the rotational cylinder upon the optical axial direction, additionally supporting a lens frame upon an interior portion of the straight line guide cylinder. In addition to supporting the lens groups, the lens frame includes a cam follower, such that the cam follower passes through a groove aperture that extends along an optical axial direction of the linear guide cylinder, and which fits with the cam groove that is installed upon the interior surface of the rotational cylinder.

When the rotational cylinder rotates, it is possible for the lens frame and the lens groups that are supported by the lens frame to move upon the optical axial direction in accordance with a cam shape of the cam groove, avoiding being rotated in the process by tracking the groove aperture of the linear guide cylinder. The rotational cylinder and the linear guide configure a structure wherein a rotational key, which is placed upon the straight line guide, and which protrudes upon a radial direction of the straight line guide, and a rotational groove, which is placed upon an interior diameter of the rotational cylinder, are fitted together, such that the linear guide cylinder is capable of the relative rotation between the structure and the rotational cylinder, and of moving in a unified manner with the rotational cylinder upon the optical axial direction.

In general, the fixed cylinder is commonly formed from a resin. Given that the cam groove that is placed upon the fixed cylinder is formed upon an interior diameter side of the fixed cylinder, a mold for forming the cam groove is made into a plurality of segments, and the mold is released from the item thus formed after the formation of the item, a configuration is commonly implemented wherein each respective segmented mold is caused to slide toward a center of the fixed cylinder. A technique is used that causes a latitudinal cross-section of the cam groove to assume a tapering surface with respect to a latitudinal surface, i.e., an axial cross-section, of the fixed cylinder, in order to prevent an undercut by the sliding of the mold upon the fixed cylinder. Given that the mold slides toward a center axial direction of the fixed cylinder, or put another way, toward an interior radial direction side of the fixed cylinder, a site of a fluctuation of the cam groove with respect to the fixed cylinder constitutes a target site for the undercut, and a site whereat the cam groove does not fluctuate is not undercut.

As described herein, the lateral cross-section shape becomes the tapering surface of the cam groove, and it is typical for the cam follower, which fits together with the cam groove that becomes the tapering surface, to comprise a conical shape in order to fit with the taper surface shaped cam groove. By presuming a configuration of the cam groove and the cam follower such as is described herein, it is possible for the rotational cylinder to move with precision upon the optical axial direction, while rotating upon a circumference of the optical axis, with respect to the fixed cylinder. In addition, it is possible to apply a relationship between the cam follower and the cam groove to the lens frame and the rotational cylinder, as described herein, as well as to a cam fitting among the rotational cylinders, in addition to the relationship between the fixed cylinder and the rotational cylinder alone. The cam follower is furthermore not simply restricted to protruding externally, and it would be additionally possible to apply the cam follower so as to protrude internally as well, in like fashion.

A lens barrel, such as is described herein, which is primarily embedded within such as a digital camera, as well as being used in other typical photographic devices, may on occasion incur a powerful impact as a result of such as a fall when the lens barrel is in a picture-taking mode. An exertion of such an impact upon the lens barrel results in a tremendous load being exerted in turn upon the cam follower portion by way of a member that configures the lens barrel. Given that the cam follower portion is fitted at an incline with respect to an axial direction of the lens barrel, the load being exerted upon the axial direction of the lens barrel thus causes a slippage to occur, the rotational cylinder or the fixed cylinder are deformed by being pressed by the cam follower, the cam follower becomes misaligned from the cam groove, and a malfunction may arise.

A variety of structures have been proposed in order to solve the problems described herein. One such structure is a zoom lens barrel disclosed according to Japanese Patent Application Laid Open No. 2003-84185. That is to say, a configuration is described according to Japanese Patent Application Laid Open No. 2003-84185 comprising a first frame member, further comprising a first cam groove and a second cam groove, and a second frame member, further comprising a first cam follower and a second cam follower, and which is capable of extending and retracting with respect to the first frame member. The first cam groove and the second cam groove of the configuration described according to Japanese Patent Application Laid Open No. 2003-84185 further comprise a partition portion that is formed from a taper portion, which inclines at a prescribed quantity with respect to the optical axis, with respect to a first region that extends upon a circumference direction of the first frame member, and a vertical portion that is formed in a vertical direction upon the optical axis, and further comprise a partition portion that is formed solely from the taper portion that inclines at the prescribed quantity with respect to the optical axis, with respect to a second region that differs from the first region. When the second frame member extends and retracts relative to the first frame member, either the first cam follower or the second cam follower, at a minimum, is fitted at all times with either the first cam groove or the second cam groove, upon an entirety within a range of movement of the second frame member relative to the first frame member, and an external force that acts upon the second frame member is received with the vertical portion of the cam groove.

Given such a configuration as is described herein, two cam followers are required to mutually regulate a relative positional relationship between the two frame members, and the requirement of the two cam followers results in an increase in a quantity of components and an enlargement of a space required to house the components. Furthermore, if the respective positions of the two cam followers are even slightly flawed in their precision, either a compression force or a pulling force will be exerted between the two cam grooves by the two cam followers. As a result, it is necessary to exert a tremendous quantity of force in order to cause the configuration to operate, which is a factor that gives rise to a malfunction.

Japanese Patent Application Laid Open No. 2002-90611 similarly discloses a lens barrel that approximates the invention disclosed according to Japanese Patent Application Laid Open No. 2003-84185. The invention disclosed according to Japanese Patent Application Laid Open No. 2002-90611 differs from the invention disclosed according to invention 2003-84185 in that one cam follower of the two cam followers is treated as a runner, and the runner is fitted upon a planar portion. Similar to the invention disclosed according to Japanese Patent Application Laid Open No. 2003-84185, the invention disclosed according to Japanese Patent Application Laid Open No. 2002-90611 incurs an increase in a quantity of components and an enlargement of a space required to house the components, and also demands a high degree of precision, respectively, of each of the two cam followers.

In addition, Japanese Patent No. 4070351 discloses an optical device, comprising a collapsible lens barrel, which further comprises a cam groove, which is shaped in a latitudinal cross section tapering shape, and a cam follower, which is conically shaped, and which is fitted with the cam groove. Placing a guide partition upon a position corresponding to aft of the optical axial direction of the cam follower, which is guided by a component further corresponding to a state of extension by the cam groove, such that the guide partition comes into contact with the cam follower, causes an impact to be absorbed by the guide partition.

All of the cited patent application references described herein respectively disclose forming the latitudinal cross section shape of the cam groove into the tapering shape, and forming the cam follower that fits with the cam groove into the conical shape, in order to facilitate manufacturing the conical shaped member that comprises the cam groove with a unified resin formation. The relationship of the fitting of the cam groove, which is shaped in the latitudinal cross section shaped tapering shape, with the conically shaped cam follower, is susceptible to coming undone by an impact being exerted upon the fitting of the cam groove with the cam follower, and thus, all of the cited patent application references are configured such that either a) an external force acting upon the fitting of the cam groove with the cam follower is absorbed by the vertical portion of the cam groove, or b) an impact is absorbed by a guide partition, which is installed upon a position that corresponds to the aft of the cam follower in the optical axial direction.

As described herein, however, according to the invention disclosed according to Japanese Patent Application Laid Open No. 2003-84185 and the invention disclosed according to Japanese Patent Application Laid Open No. 2002-90611, two cam followers are required to regulate the relative positional relationship between the two respective frame members, resulting in an increase in the number of components and a greater space required for the configurations. A further problem is that if the respective positions of the two cam followers are even slightly flawed in their precision, it is necessary to exert a tremendous quantity of force in order to cause the configuration to operate, which may easily provide a factor that gives rise to a malfunction.

In addition, according to the invention disclosed according to Japanese Patent No. 4070351, the impact that is exerted upon the configuration from an external source is absorbed solely by a guide partition, which is placed upon a position corresponding to aft of the optical axial direction of the cam follower, which in turn is guided by a component corresponding to a state of extension by the cam groove, such that the guide partition comes into contact with the cam follower. A concept that the guide partition constitutes a portion of a configuration that is intended to increase the precision of the lens position is not present with the invention disclosed according to Japanese Patent No. 4070351.

SUMMARY OF THE INVENTION

An object of the present invention is to provide, on a per lens basis, a cam fitting structure, which is capable of maintaining an impact resistance that is sufficient to satisfy a demand for a large degree of impact resistance within a photographic region, by way of a unified form that is created by a mold, and with a unified form comprising a cam groove shape that does not include an undercut.

To accomplish the above object, a lens driving device according to an embodiment of the present invention includes a plurality of lens groups, a plurality of lens frames that support the lens groups, a drive device that causes the lens frames to move upon an optical axial direction, and a fixed member that supports the drive device.

The lens driving device further includes a rotational cylinder, which is installed upon an interior side of the fixed member, and is capable of moving upon the optical axial direction while rotating, a cam groove, which is installed upon an interior diameter side of the fixed member, and a cam follower of the rotational cylinder, which fits with the cam groove portion. When a photograph is not being taken, a state obtains wherein the plurality of lens groups are collapsed, by an interval between the plurality of lens groups being narrowed, and when a photograph is being taken, the plurality of lens groups moves upon the optical axial direction.

The cam groove is formed such that the rotational cylinder extends upon the axial direction upon a range of movement from the state of being collapsed to the state of taking the picture, and is further formed in a line with a vertical surface upon the axial direction of the rotational cylinder such that, in a range of taking the picture, the rotational cylinder does not move upon the axial direction, even if the rotational cylinder rotates. In addition, the cam groove further comprises a cam surface with a cross section that tapers in the vertical direction with respect to the axial direction of the fixed cylinder, and a vertical planar surface portion with respect to the axial direction of the fixed cylinder.

The cam follower further includes a conical portion and a cylindrical portion, which protrudes upon a radial direction of the rotational cylinder. The conical portion of the cam follower is made to fit with the tapering cam surface of the cam groove upon at least a portion of the range whereupon the rotational cylinder moves upon the optical axial direction, and the cylindrical portion of the cam follower is made to fit with the planar surface portion of the cam portion upon the range whereupon the rotational cylinder does not move upon the optical axial direction.

DETAILED DESCRIPTION OF THE PREFERRED EMBODIMENTS

An embodiment of a lens driving device and an image forming apparatus, such as a camera, according to the present invention will be described in detail hereinafter, with reference to the accompanying drawings.

Figure 1:
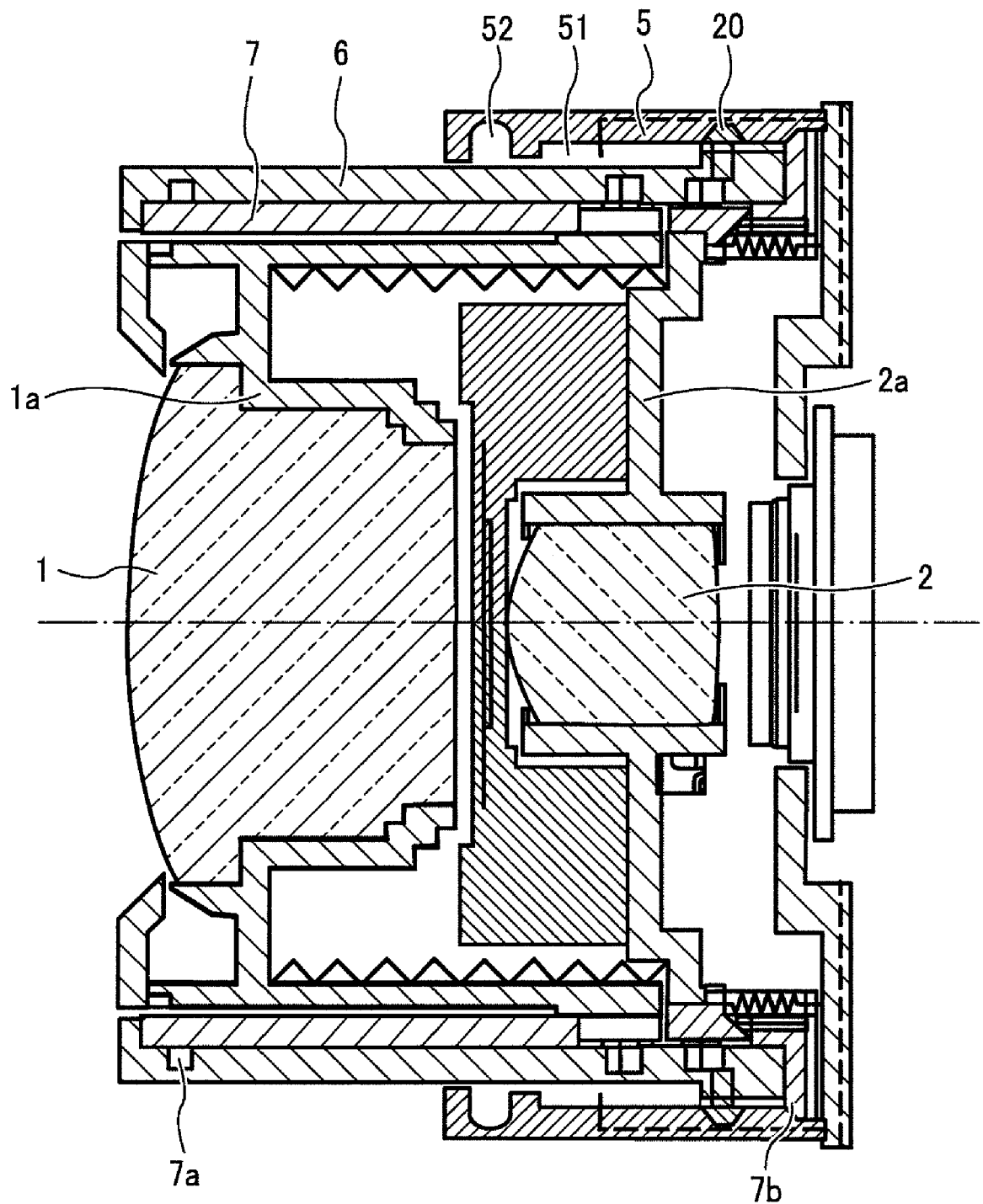
FIG. 1 is an elevation cross sectional view showing a lens driving device according to an embodiment of the present invention, in a state of being collapsed.
Figure 2:
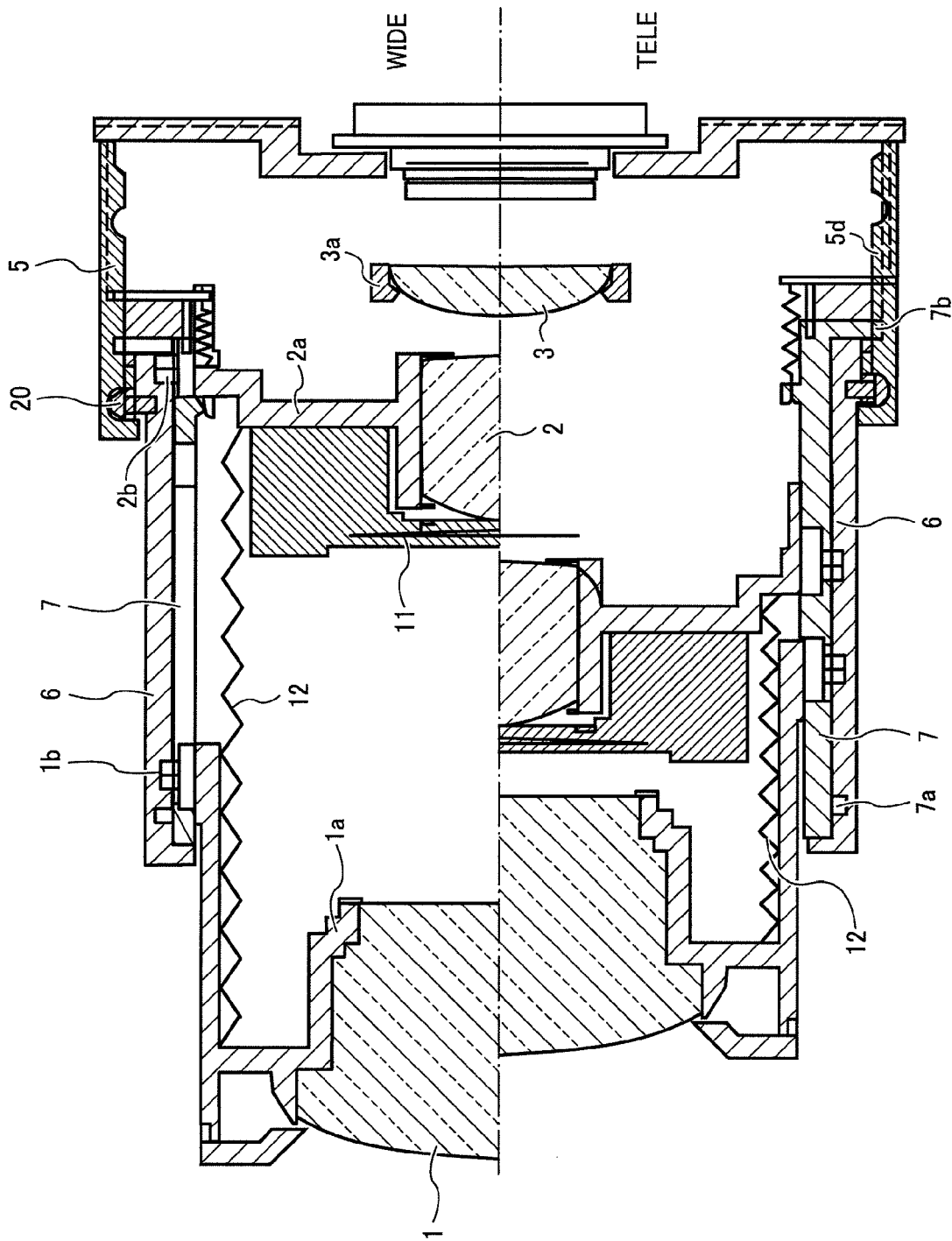
FIG. 2 is an elevation cross sectional view showing a comparison between a wide angle end or position and a telephoto end or position when taking a picture, according to the embodiment.

FIG. 1 illustrates a lens driving device according to the present invention, in an instance of an image forming apparatus, such as a camera, with a lens barrel of a zoom lens attached, with the lens driving device in a state of being collapsed within the image forming apparatus. FIG. 2 illustrates a state of the lens barrel of the zoom lens when photography is possible. An upper portion of FIG. 2 depicts a wide angle state, and a lower portion of FIG. 2 depicts a telephoto state.

The lens driving device shown in FIG. 1 and FIG. 2 includes a plurality of lens groups, and the plurality of lens groups, as an instance, are formed from a first lens group 1, a second lens group 2, and a third lens group 3. A change in a magnification, or put another way, a change in a focal length, is performed by changing a position of the first lens group 1 and the second lens group 2 upon the optical axial direction.

The third lens group 3 is a focus lens, or put another way, a lens for focusing an image. A lens frame 3a of the third lens group 3 is placed upon an end portion of a lever. A rotation of the lever within a surface that is orthogonal to the optical axis causes the lens group 1 and the lens group 2 to retract out of the lens barrel when collapsing the lens group 1 and the lens group 2, such as is depicted in FIG. 1. When the lens group 1 and the lens group 2 are in a state of being extended to a position that will allow a photograph to be taken, the lens group 1 and the lens group 2 extend toward a rear of the second lens group 2 within the lens barrel, and the optical axis of the lens group 3 is made to align with the optical axis of the lens group 1 and the lens group 2, such as is depicted in FIG. 2. The first lens group 1 is supported by a first lens frame 1a, the second lens group 2 is supported by a second lens frame 2a, and the third lens group 3 is supported by a third lens frame 3a, respectively. A mechanical shutter 11 is mounted upon the second lens frame 2a.

The first lens frame 1a and the second lens frame 2a respectively include a cam follower 1b and a cam follower 2b, which fit with a cam part 50 that is formed upon the interior diameter side of the rotational cylinder 6. The cam part includes a first cam portion formed such that the rotational cylinder 6 extends in the optical axis upon a range whereupon the rotational cylinder 6 moves from the collapsed state to a photography state and a second cam portion formed such that the rotational cylinder 6 does not move upon the optical axis upon the photography range, even if the rotational cylinder 6 rotates. The first cam portion has a cam groove 55 of a tapering cross section in a vertical direction with respect to the optical axis of the fixed cylinder 5. The second cam portion has a vertical planar surface 54 with respect to the optical axis of the fixed cylinder 5. Upon passing through a linear groove, which extends upon an optical axial direction of a straight line guide cylinder 7, and which, in turn, is fitted upon the interior diameter of the rotational cylinder 6, the cam follower 1b and the cam follower 2b are respectively embedded in a unified manner with the first lens frame 1a and the second lens frame 2a, and are fitted with the linear groove and each respective cam groove in a position of intersection with the linear groove and each respective cam groove. The position of intersection with the linear groove and each respective cam groove moves upon the optical axial direction in accordance with the rotation of the rotational cylinder 6, such that the cam follower 1b and the cam follower 2b, which fit with the position of intersection with the linear groove and each respective cam groove, as well as the first lens frame 1a and the second lens frame 2a, and the first lens group 1 and the second lens group 2, which are fitted in the unified manner with the cam follower 1b and the cam follower 2b, are made to move upon the optical axial direction according to a shape of each respective cam groove.

The linear guide cylinder 7 comprises a key 7a, which is placed upon a leading end portion, i.e., a left end portion as depicted in FIG. 1 and FIG. 2, and which protrudes in a radial direction with respect to the leading end portion of the linear guide cylinder 7. The key 7a is configured to fit with a key groove that is formed upon the interior circumference side of the rotational cylinder 6 in a circumference direction, or put another way, in a direction that is orthogonal to the optical axis. As a result, it is possible for the rotational cylinder 6 and the linear guide cylinder 7 to rotate relative to one another about the optical axis, and to move in the unified manner upon the optical axial direction.

The rotational cylinder 6 is linked with the fixed cylinder 5 by way of the fitting of the cam groove with the cam follower, and it is possible to move along the optical axial direction of the rotational cylinder 6 by the rotational cylinder 6 rotating about the optical axis with respect to the fixed cylinder 5. In addition, a linear key 7b is configured to protrude externally from a rear end portion of the linear guide cylinder 7. The linear key 7b is configured to fit with a linear guide groove 5d, which is formed upon an interior circumference side of the fixed cylinder 5. Accordingly, when the rotational cylinder 6 moves, by way of the rotation of the rotational cylinder 6, upon the optical axial direction with respect to the fixed cylinder 5, the linear guide cylinder 7 is configured so as to move in the unified manner with the rotational cylinder 6, without rotating, by way of the linear key 7b and the fitting of the linear guide cylinder 7 with the linear key 7b. According to the aforementioned structure, when the rotational cylinder 6 rotates, the rotational cylinder 6 is capable of moving, upon the optical axial direction, with respect to the fixed cylinder 5, from a collapsed position, as depicted in FIG. 1, so as to extend to a position of being able to take a picture, as depicted in FIG. 2. In addition, as described herein, the first lens group 1 and the second lens group 2 are respectively capable of moving, according to the rotation of the rotational cylinder 6, and as guided by the cam groove of the rotational cylinder 6, and are also capable of moving to the position of being able to take the picture, as depicted in FIG. 2. In addition, it is possible to change the magnification at the position where the movement of the first lens group 1 and the second lens group 2 is possible upon a range from the wide-angle end, as depicted in the upper part of FIG. 2, to the telephoto end, as depicted in the lower part of FIG. 2.

A compression spring 12 is interposed between the first lens frame 1a and the second lens frame 2a. The compression spring 12 is a coiled spring, and is formed with a diameter that does not exert an impact upon an operation of the first lens group 1 and the second lens group 2. It is possible to maintain the cam follower 1b and the cam follower 2b of the lens frame 1a and the lens frame 2a in a state of contact with the respective cam surfaces at all times, and it is also possible to regulate a collapse of the first lens group 1 and the second lens group 2 with respect to the rotational cylinder 6, and to maintain the first lens group 1 and the second lens group 2 in a stable attitude, all by way of a force imparted by the compression spring 12.

Figure 3:
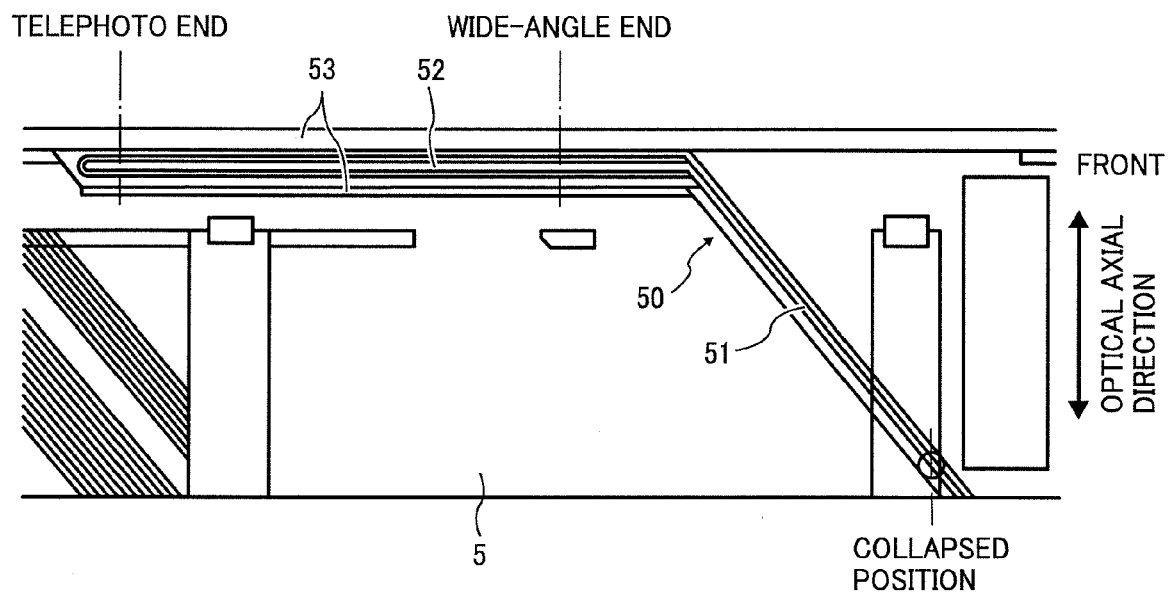
FIG. 3 is a development view showing an interior circumference surface of a fixed cylinder according to the embodiment.

As described herein, the rotational cylinder 6 is linked with the fixed cylinder 5 by the fitting of the cam groove with the cam follower. A description of the particulars of the linkage between the rotational cylinder 6 and the fixed cylinder 5 will be provided hereinafter. FIG. 3 is a development diagram that depicts the interior circumference side of the fixed cylinder 5. A cam groove 50, which fits with the cam follower of the rotational cylinder 6, is formed upon the interior circumference side of the fixed cylinder 5. The cam groove 50 includes a linear cam groove portion 51, which facilitates, by way of the rotation of the rotational cylinder 6, the dimension of the lens barrel in the optical axial direction becoming the shortened collapsed state as the lens groups close in on one another as they approach an imaging surface when the photography is not being taken, and further facilitates the rotational cylinder 6 reaching a position of maximum extension between the collapsed state and the photography state of the lens groups, such that the lens groups will be able to extend away from the imaging surface when the photography is being taken. The cam groove 50 further includes a cam groove portion 52 in a circumference direction, extending upon a vertical surface with respect to a central axis of the fixed cylinder 5, such that the rotational cylinder 6 does not move upon the optical axis, given that it is possible for the rotational cylinder 6 to rotate at the position of maximum extension in the photography state. The cam groove portion 52 in the circumference direction is formed contiguously with the linear cam groove portion 51. Given the configuration described herein, it is possible to rapidly extend each respective lens group from the collapsed state to the photography state, and it is possible to cause each respective lens group to move upon the optical axial direction in accordance with the cam groove that is placed upon the interior diameter of the rotational cylinder 6, and thereby to contiguously magnify the photography, by rotating the rotational cylinder 6 when each respective lens group is in the extended state in the photography region.

Figure 6:
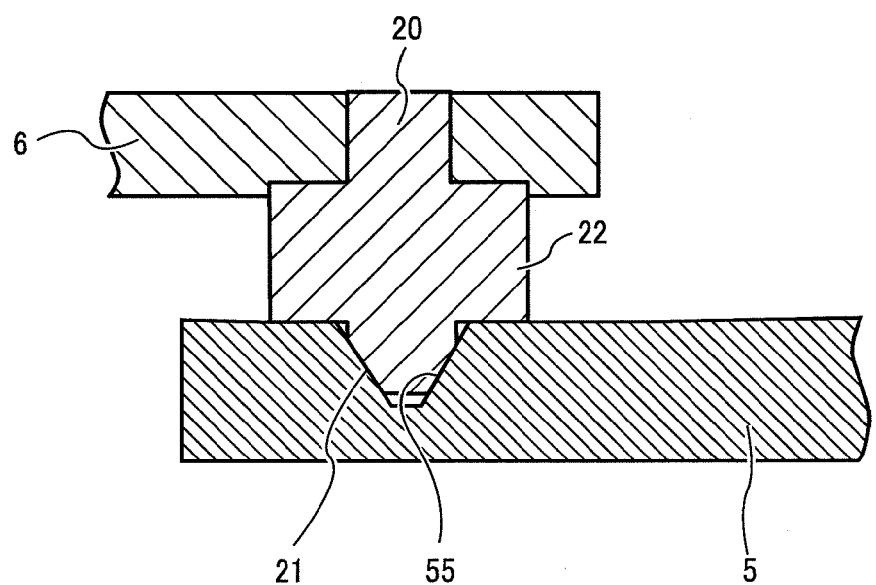
FIG. 6 is a cross sectional view showing a fitting relationship between the cam follower and the cam groove in a state of collapsing a plurality of lens groups, according to the embodiment.

A lateral cross section shape of the cam groove 50 of the fixed cylinder 5, or put another way, a cross section shape in a direction that is orthogonal to a center axial line of the fixed cylinder, has either a trapezoid shape or a tapering shape, which gradually opens widely toward an open end side, such as is depicted in FIG. 6. A guide portion 53 of a protrusion portion shape is formed in a line with the cam groove portion 52 in the circumference direction of the fixed cylinder 5, and sandwiches the cam groove portion 52 in the circumference direction on both sides.

Figure 4:
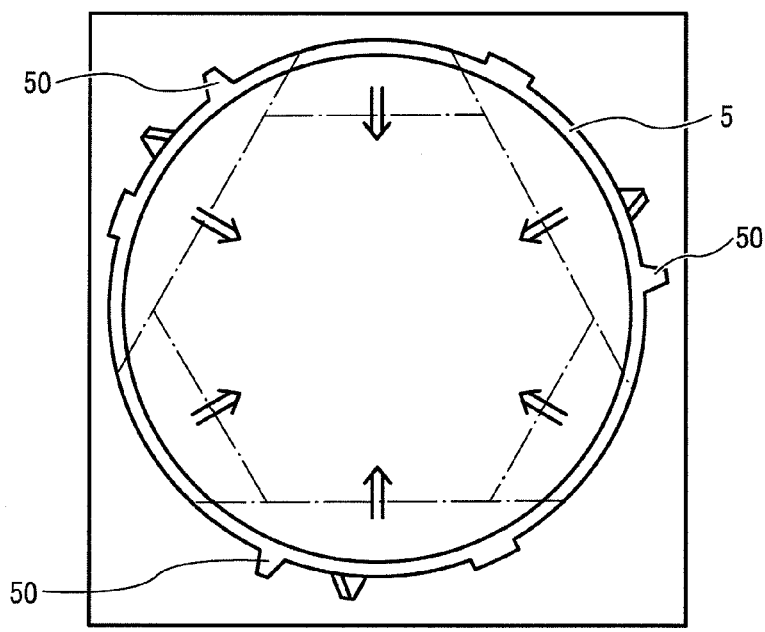
FIG. 4 is a view showing a movement when a segmented mold is released, in a case where the fixed cylinder is manufactured in a unified form, according to the embodiment.

The fixed cylinder 5 is formed in a unified manner from a resin. FIG. 4 depicts an instance of a positioning of a mold for forming the interior diameter of the fixed similar 5, comprising the cam groove 50. The mold is segmented into six parts, expanding externally from the central axis of the fixed cylinder 5 when the mold is cast such that an exterior circumference surface shape of each respective mold takes on a shape of the interior radial surface of the fixed cylinder 5, and the interior radial surface of the fixed cylinder 5 is thus formed in a copy of the exterior circumference surface shape of the mold. A prescribed mold is employed in forming an exterior circumference surface of the fixed cylinder 5. In order to cause the mold for the formation of the interior radial surface to release after the formation of the interior circumference surface of the fixed cylinder 5, the mold is segmented, each respective segmented mold is caused to slide upon an interior side toward the central axis of the fixed cylinder, thus comprising a configuration that avoids friction with a protrusion portion of a mold that forms the cam groove 50. Given that the mold slides in a linear manner toward the central axis of the fixed cylinder 5, a lateral surface of the cam groove 50, and in particular, both sides of the linear cam groove portion 51, which is formed in order to move each respective lens group from the collapsed state to the photography state, are mutually undercut with respect to what would be a regular planar surface shape of both sides of the linear cam groove portion 51. The undercutting of both sides of the linear cam groove portion 51 is thus prevented from occurring by shaping the latitudinal cross section shape of the cam groove 50 in the tapering surface, thereby forming the trapezoid shape, as described herein.

Figure 8:
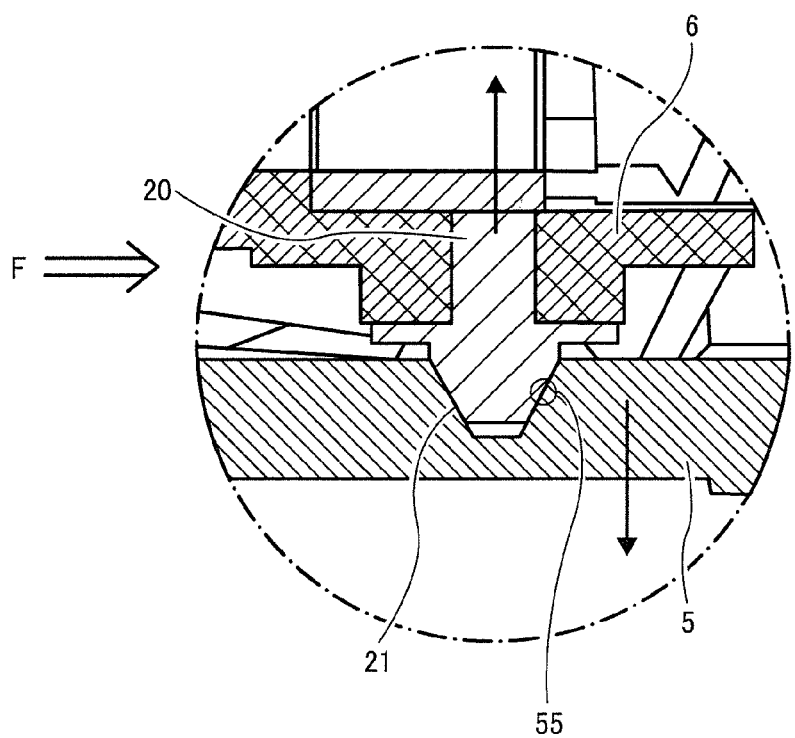
FIG. 8 is a cross sectional view showing a fitting relationship between a cam follower and a cam groove with respect to a conventional lens driving device.

Typically, the cam groove that is shaped as described herein also has a similar trapezoidal cross section shape upon the cam groove portion 52 in the circumference direction, which extends upon the vertical surface that includes the photography region with respect to the central axis of the fixed cylinder 5, and the cam follower of the rotational cylinder 6 includes the conical shape so as to fit with the cam groove 52, which fits with each respective tapering surface, thereby establishing a position of the axial direction of the rotational cylinder 6. FIG. 8 depicts a state of a conventional cam fitting between a cam surface 55, having a taper shaped lateral cross section, and the conical portion 21 of the cam follower 20. When a load F, such as an impact, is exerted upon the lens barrel in the present state, the load is transmitted to a fitting portion of the conical portion 21 of the cam follower 20 and the tapering surface 55 of the cam groove. Given that the cam fitting portion includes the tapering surface 55, a slippage occurs with the cam follower 20 with respect to the tapering surface 55, a force arises, such as is depicted by the arrows in FIG. 8, which deforms the exterior of the fixed cylinder 5 and the interior of the rotational cylinder 6, causing the cam follower 20 to come apart from the cam groove and causing the rotational cylinder 6 to malfunction as a result.

According to the embodiment of the present invention, however, the latitudinal cross section of the cam groove 50 of the fixed cylinder has a tapering shape, and is set such that the fitting of the cam groove 50 and the cam follower 20 does not come apart due to an external force being exerted upon the fitting thereof, regardless of the fact that the fitting surface of the cam follower 20, which fits with the cam groove 50, has the conical shape.

Further particulars of the cam fitting of the cam groove 50 and the cam follower 20 will be described hereinafter.

Figure 5:
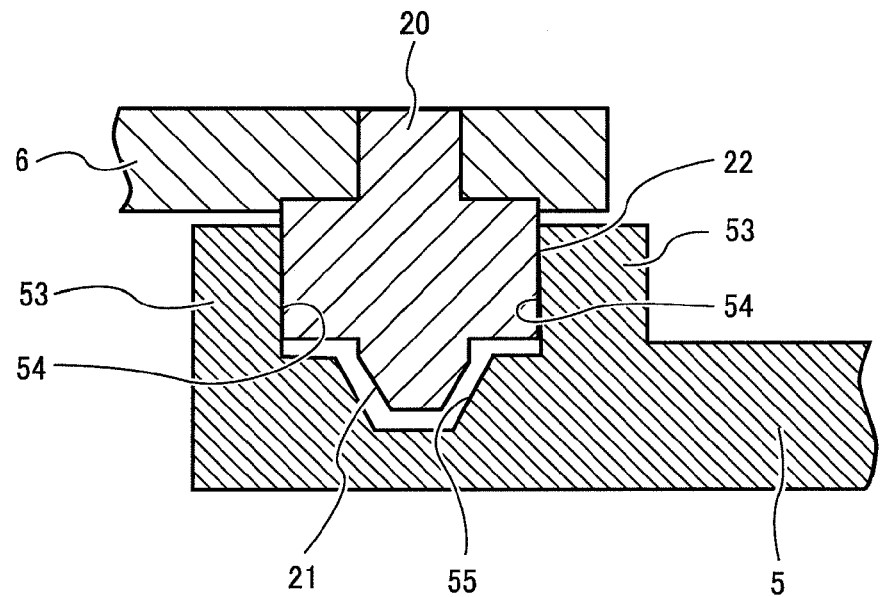
FIG. 5 is a cross sectional view showing a fitting relationship between a cam follower and a cam groove in a state where it is possible to take a picture, according to the embodiment.

FIG. 5 illustrates a cam fitting state between the fixed cylinder 5 and the rotational cylinder 6 in the photography region, according to the embodiment of the present invention. The cam groove 50 is placed upon the interior radial side of the fixed cylinder 5. The cam groove portion 52 in the circumference direction of the cam groove 50 comprises the tapering surface 55 upon a side that is furthest from the central axis, and the pair of protrusion portions 53 are formed upon a side that is nearest to the central axis, upon both sides of the cam groove portion 52 in the circumference direction, so as to arise vertically with respect to the axial direction, and in a unified manner with the fixed cylinder 5. A surface of each of the pair of protrusion portions 53 that faces the other member of the pair comprises a mutually parallel planar surface 54. The pair of planar surfaces 54 work in conjunction with the cam follower 20 when the rotational cylinder 6 moves to the photography region, and, given that the pair of planar surfaces 54 extend in an imitation of the vertical planar surface with respect to the central axis of the fixed cylinder 5, no undercut is formed upon the pair of planar surfaces 54 or the pair of protrusion portions 53 that comprise the planar surfaces 54 when the mold is released after the formation of the fixed cylinder 5.

The cam follower 20 of the rotational cylinder 6, which fits with the cam groove 50, includes a separate component from the rotational cylinder 6, and a leading end portion, or put another way, a portion of the cam follower 20 that is separated from the rotational cylinder 6 upon the radial direction of the rotational cylinder 6, has the conical shape, and a middle portion, or put another way, a portion of the cam follower 20 that is near to the rotational cylinder 6 upon the radial direction of the rotational cylinder 6, comprises the cylindrical shape.

In FIG. 5, reference numeral 21 denotes the conical leading end portion of the cam follower 20, and reference numeral 22 denotes the cylindrical middle portion of the cam follower 20. A base portion of the cam follower 20 comprises a spindle shape, and the spindle shaped portion of the cam follower 20 is fixed upon the rotational cylinder 6 by a press fitting. A structure of a coupling of the spindle shaped portion of the cam follower 20 with the rotational cylinder 6 may be chosen arbitrarily, and it would be permissible, as an instance, to employ a screw coupling as well.

FIG. 5 illustrates a state of the cam fitting with regard to the photography range. With regard to the photography range, as depicted in FIG. 5, the cylindrical shaped portion of the cam follower 20 of the rotational cylinder 6 fits between the pair of protrusion portions 53 of the fixed cylinder 5, the cylindrical portion 22 of the cam follower 20 fits with the planar surface portions 54 of the pair of protrusion portions 53, and the cylindrical portion 21 of the cam follower 20 is distanced from the taper shaped cam surface 55 of the fixed cylinder 5. When the load, such as the impact, is incurred in the photography state, configuring such a relationship of fittings as is described herein causes the load to be exerted from the cylindrical portion 22 of the cam follower 20 to the planar surface portions 54 of the pair of protrusion portions 53, thereby facilitating receiving the cam follower 20 without giving rise to the slippage between the respective fitting surfaces.

The cam follower 20 is made of a metal. Given that the metallic cam follower 20 is coupled with the rotational cylinder 6 by such as the press fit by way of the spindle shape portion of the metallic cam follower 20, it is possible thereby to prevent the deformation of the cam follower 20 proper, even if an impact such as is described herein is exerted upon the cam follower 20, and it is thus possible to prevent the cam follower 20 from being destroyed, by distributing the moment that is exerted upon the cam follower 20 along the spindle portion overall. In addition, the cylindrical portion of the cam follower 20 is located nearer to the rotational cylinder 6 than the tapering portion, and the moment resulting from the load is reduced by the arrangement of the portions of the cam follower 20 described herein.

FIG. 6 illustrates a circumstance of a cam fitting portion when the rotational cylinder 6 moves by rotating upon the range from the collapsed state to the photography state. The fitting of the cylindrical portion of the cam follower 20 with the pair of protrusion portions 53 comes apart upon the range from the collapsed state to the photography state, and the conical portion 21 of the cam follower 20 fits with the taper shaped cam surface 55 of the cam groove 50. Such a configuration, which causes the cylindrical portion 22 of the cam follower 20 of the rotational cylinder 6 to fit with the pair of protrusion portions 53, which are orthogonal with respect to the central axis of the fixed cylinder 5 in the photography state, and which causes the conical portion of the cam follower 20 to fit with the taper shaped cam surface 55 of the linear cam groove portion 51 upon the range from the collapsed state to the photography state, is thereby capable of preventing the undercut from being formed when the mold is released after the unified molding formation of the fixed cylinder 5.

Figure 7:
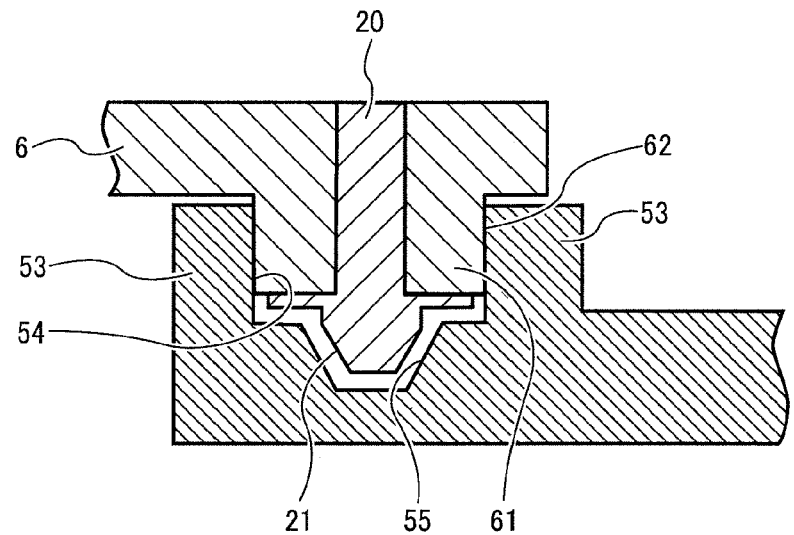
FIG. 7 is a cross sectional view showing a different fitting relationship between the cam follower and the cam groove that is applicable to the present invention.

FIG. 7 illustrates a variant embodiment of the present invention. In FIG. 7, the cam follower 20 is made of a metal in a manner separate from the rotational cylinder, and the cylindrical portion of the cam follower is formed in a unified manner with the rotational cylinder 6 when the rotational cylinder 6 is itself formed in the unified manner. Reference numeral 61 denotes the cylindrical portion of the cam follower. The spindle portion of the cam follower 20 is press fitted with the rotational cylinder 6 by way of a central aperture of the cylindrical portion 61 of the cam follower. Put another way, the cylindrical portion 61 of the cam follower is formed so as to cover the spindle portion of the cam follower 20. The leading end portion of the cam follower 20 is formed in the conical shape. Reference numeral 21 denotes the conical portion of the cam follower 20. The cylindrical portion 61 of the cam follower, which is formed in the unified manner with the rotational cylinder 6, fits so as to be sandwiched by the pair of protrusion portions 53 in the state of being able to take the photograph, and the conical portion 21 of the cam follower 20 is distanced from the tapered surface 55 of the cam groove 50. In addition, only the conical portion 21 of the cam follower 20 fits with the tapered surface 55 of the linear cam groove 51 upon the range from the collapsed state to the photography state. Such a configuration reinforces, with the metallic spindle of the cam follower 20, the cylindrical portion of the cam follower against the load that is externally exerted upon the cylindrical portion of the cam follower, allowing preventing the destruction of the cylindrical portion of the cam follower, while the unified formation of the cylindrical portion of the cam follower with the rotational cylinder 6 allows improving a positional precision of the axial direction of the rotational cylinder 6 when taking the picture.

The configuration portion that incorporates the rotational cylinder 6, the cam follower 20 of the rotational cylinder 6, and the cam groove 20 of the fixed cylinder configures a drive mechanism that causes each respective lens group, as well as the lens frames that support the respective lens groups, to move upon the optical axial direction.

According to another embodiment, the lens driving device includes a lens, a lens frame configured to support the lens, and a drive mechanism configured to cause the lens frame to move upon an optical axis. The drive mechanism includes an exterior cylinder and an interior cylinder, which are concentric with respect to one another, a cam part is installed upon one of the exterior cylinder and the interior cylinder, and a cam follower, which fits with the cam part, is installed upon the other of the exterior cylinder and the interior cylinder. The drive mechanism causes the exterior cylinder and the interior cylinder to relatively rotate about the optical axis and to change a relative position of the exterior cylinder in relation to the interior cylinder upon the optical axis to control a position of the lens upon the optical axis. The cam part includes a first cam portion having a cam groove of a tapering cross section in a vertical direction with respect to the optical axis and a second cam portion having a vertical planar surface with respect to the optical axis. The cam follower is further configured to protrude upon a radial direction of the other of the exterior cylinder and the interior cylinder, and to further comprise a conical portion and a cylindrical portion. The cam groove of the first cam portion extends at a predetermined incline with respect to the optical axis and fits with the conical portion of the cam follower, and the planar surface of the second cam portion extends in a vertical direction with respect to the optical axis and fits with the cylindrical portion of the cam follower.

The first cam portion may be configured to relatively rotate the exterior cylinder in relation to the interior cylinder about the optical axis and to change a relative position of the exterior cylinder in relation to the interior cylinder upon the optical axis. The second cam portion may be configured not to change a relative position of the exterior cylinder in relation to the interior cylinder upon the optical axis, even if the exterior cylinder is relatively rotated in relation to the interior cylinder about the optical axis.

The planer surface of the second cam portion may be formed at both sides of the cam groove in line with surfaces which are vertical to the optical axis and disposed in a circumferential direction of the one of the exterior cylinder and the interior cylinder.

According to the embodiment described herein, it is possible for the fixed cylinder 5 and the rotational cylinder 6, which are engaged in a mutually fitting external cylinder and internal cylinder relationship, to rotate relatively to one another about the central axis in the photography state, and the cam groove 50 is formed upon the fixed cylinder 5 in order to prevent a relative movement upon the optical axial direction. It is possible for the fixed cylinder 5 and the rotational cylinder 6 to rotate relatively to one another upon at least a portion of the range whereupon the fixed cylinder 5 and the rotational cylinder 6 move from the collapsed state to the photography state, and the cam groove 50 is formed such that the rotational cylinder 6 moves upon the optical axial direction. The cam follower 20 of the rotational cylinder 6, which fits with the cam groove 50, protrudes upon a radial direction of the drive mechanism, and comprises the conical shaped portion and the cylindrical portion. The cam groove 50 comprises the linear cam groove portion 51, which inclines with respect to the axial direction of the fixed cylinder 5 and the rotational cylinder 6, and the cam groove portion 52 in the circumference direction, which is in line with the vertical planar surface with respect to the axial direction. The configuration is such that the conical surface 21 of the cam follower 20 fits with the inclined surface portion 55 of the cam groove 50 upon at least a portion of the range whereupon the rotational cylinder 6 moves upon the optical axial direction relative to the fixed cylinder 5, and also such that only the cylindrical surface 22 of the cam follower 50 fits with the planar surface 54 of the cam groove 50, upon the photography range whereupon the rotational cylinder 6 does not move upon the optical axial direction with respect to the fixed cylinder 5. Accordingly, while the configuration described herein is a simple configuration, no slippage occurs between the cam follower 20 and the cam groove 50 even if such as an impact is exerted in the state of being capable of photography. Thus, it is possible to provide a lens driving device that is resistant to impact, such that the malfunction of the cam follower 20 coming apart from the cam groove 50 does not occur.

Whereas according to the embodiment, the configuration comprises the cam follower 20 protruding upon the exterior side of the rotational cylinder 6, and protruding upon the interior side of the fixed cylinder 5, it would also be permissible to configure the present invention so as to cause the cam follower 20 to fit with the cam groove that is formed upon the exterior circumference side of the rotational cylinder. In addition, it would be possible to apply a cam fitting relationship with a conception similar to the cam fitting of the rotational cylinder 6 and the fixed cylinder 5, including the cam fitting of the rotational cylinder 6 and the lens frame, and the cam fitting of the respective rotational cylinders.

According to the present invention, it is possible to rapidly perform the extension and movement of the lens groups from the collapse of each respective lens group to the position where the photography is possible, and in addition, it is possible to provide a lens driving device that is resistant to impact with a simple configuration, such that even if the load is exerted upon the cam follower by such as an impact upon the range where the photography is possible, the slippage does not occur, and no malfunction of the cam follower separating from the cam groove arises.

The cylindrical portion of the cam follower is placed upon the rotational cylinder further along upon the radial direction than the tapering portion, and when the load is exerted upon the cam follower, it is possible to reduce the moment that is exerted upon the cam follower, and it is thus possible to reduce a stress that is exerted upon a connection portion between the rotational cylinder and the cam follower.

It is possible to prevent the deformation of the cam follower when the load is exerted upon the cam follower, as well as to prevent a concentration of the stress upon an attachment portion by way of the cam follower being attached to the rotational cylinder by the spindle portion, and thus, it is possible to prevent the destruction of the cam follower proper.

When the load is exerted upon the cylindrical portion of the cam follower that is formed in the unified manner with the rotational cylinder, it is possible to prevent the destruction of the cam follower proper by reinforcing the cylindrical portion of the cam follower by inserting the metallic spindle portion upon the center of the cylindrical portion of the cam follower, to configure the position of the cylindrical portion of the cam follower with respect to the rotational cylinder with a high degree of precision by forming the cylindrical portion of the cam follower in the unified manner with the rotational cylinder, and thus, to offer a lens device that is capable of preventing a misalignment of the position of the lens.

It is possible to provide a lens driving device that is resistant to impact upon the range where the cylindrical portion of the cam follower fits with the planar surface portion of the cam groove, such that no slippage arises even if the load is exerted upon the cam follower by such as the impact, and no malfunction of the cam follower becoming separated from the cam groove occurs.

It is possible to provide an image forming apparatus, such as a camera, which is resistant to a load, such as an impact, by embedding a lens driving device according to the present invention upon the lens barrel of the photographic lens of the image forming apparatus.

Although the preferred embodiments of the present invention have been described, it should be understood that the present invention is not limited to these embodiments, various modifications and changes can be made to the embodiments.

What is claimed is:

1. A lens driving device, comprising:
   a plurality of lens groups;
   a plurality of lens frames configured to support the plurality of lens groups;
   a drive mechanism configured to cause the plurality of lens frames to move upon an optical axis; and
   a fixed member configured to support the drive mechanism, wherein: the drive mechanism is configured to include:
   a rotational cylinder configured to be capable of moving upon the optical axis while being positioned upon an interior side of the fixed member and rotating;
   a cam part configured to be placed upon an interior radial side of the fixed member; and
   a cam follower of the rotational cylinder, configured to fit with the cam part;
   wherein: the plurality of lens groups are in a collapsed state, when a photograph is not being taken, such that an interval between the plurality of lens groups is narrowed, whereas when a photograph is being taken, the plurality of lens groups is extended upon the optical axis;
   the cam part includes
   a first cam portion formed such that the rotational cylinder extends in the optical axis upon a range whereupon the rotational cylinder moves from the collapsed state to a photography state and
   a second cam portion formed such that the rotational cylinder does not move upon the optical axis upon the photography range, even if the rotational cylinder rotates;
   the first cam portion has a cam groove of a tapering cross section in a vertical direction with respect to the optical axis of the fixed cylinder;
   the second cam portion has a cam groove of a tapering cross section in a vertical direction with respect to the optical axis of the fixed cylinder and a vertical planar surface with respect to the optical axis of the fixed cylinder;
   the cam follower is further configured to protrude in a radial direction of the rotational cylinder, and to further include a conical portion and a cylindrical portion;
   the conical portion of the cam follower fits with the taper shaped cam groove of the first cam portion upon at least a portion of the range whereupon the rotational cylinder moves upon the optical axis; and
   the conical portion of the cam follower is distanced from the taper shaped cam groove of the second cam portion and the cylindrical portion of the cam follower fits with the planar surface of the second cam portion upon the range whereupon the rotational cylinder does not move upon the optical axis.

2. The lens driving device according to claim 1, wherein: the cylindrical portion of the cam follower is positioned to be closer toward the rotational cylinder than the conical portion of the cam follower.

3. The lens driving device according to claim 1, wherein: the cam follower is formed of a metal, separately from the rotational cylinder; a spindle portion of the cam follower is coupled with the rotational cylinder; and the cylindrical portion and the conical portion of the cam follower protrude from the rotational cylinder upon the radial direction.

4. The lens driving device according to claim 1, wherein: the cam follower is formed of a metal, separately from the rotational cylinder; the cylindrical portion of the cam follower is formed from a cylindrical portion that is formed in a unified manner with the rotational cylinder; and the spindle portion of the cam follower passes through the cylindrical portion of the cam follower and is coupled with the rotational cylinder.

5. The lens driving device according to claim 1, wherein: the planar surface of the second cam portion is formed at both sides of the cam groove in line with surfaces which are vertical to the optical axis and disposed in a circumferential direction of the fixed cylinder.

6. The lens driving device according to claim 1, wherein: the cylindrical portion of the cam follower fits with the planar surface of the second cam portion and the conical portion of the cam follower is distanced from the cam groove of the first cam portion upon the photography range.

7. The lens driving device according to claim 1, wherein: only the conical portion of the cam follower fits with the taper shaped cam groove of the first cam portion upon the range of the movement from the compressed state to the photography state.

8. An image forming apparatus configured to comprise: a photographic lens; and the lens driving device according to claim 1, configured to drive the photographic lens.

9. A lens driving device, comprising:
   a lens;
   a lens frame configured to support the lens; and
   a drive mechanism configured to cause the lens frame to move upon an optical axis,
   wherein: the drive mechanism includes an exterior cylinder and an interior cylinder, which are concentric with respect to one another, a cam part is installed upon one of the exterior cylinder and the interior cylinder, and a cam follower, which fits with the cam part, is installed upon the other of the exterior cylinder and the interior cylinder;
   the drive mechanism causes the exterior cylinder and the interior cylinder to relatively rotate about the optical axis and to change a relative position of the exterior cylinder in relation to the interior cylinder upon the optical axis to control a position of the lens upon the optical axis;

the cam part includes:
a first cam portion having a cam groove of a tapering cross section in a vertical direction with respect to the optical axis; and
a second cam portion having a cam groove of a tapering cross section in a vertical direction with respect to the optical axis of the fixed cylinder and a vertical planar surface with respect to the optical axis;
the cam follower is further configured to protrude upon a radial direction of the other of the exterior cylinder and the interior cylinder, and to further comprise a conical portion and a cylindrical portion; and
the cam groove of the first cam portion extends at a predetermined incline with respect to the optical axis and fits with the conical portion of the cam follower, the conical portion of the cam follower is distanced from the taper shaped cam groove of the second cam portion, and the planar surface of the second cam portion extends in a vertical direction with respect to the optical axis and fits with the cylindrical portion of the cam follower.

10. The lens driving device according to claim 9, wherein the first cam portion is configured to relatively rotate the exterior cylinder in relation to the interior cylinder about the optical axis and to change a relative position of the exterior cylinder in relation to the interior cylinder upon the optical axis; and the second cam portion is configured not to change a relative position of the exterior cylinder in relation to the interior cylinder upon the optical axis, even if the exterior cylinder is relatively rotated in relation to the interior cylinder about the optical axis.

11. The lens driving device according to claim 9, wherein: the planar surface of the second cam portion is formed at both sides of the cam groove in line with surfaces which are vertical to the optical axis and disposed in a circumferential direction of the one of the exterior cylinder and the interior cylinder.

12. The lens driving device according to claim 9, wherein: the cylindrical portion of the cam follower is positioned to be closer toward the other of the exterior cylinder and the interior cylinder than the conical portion of the cam follower.

13. The lens driving device according to claim 9, wherein: the cam follower is formed of a metal, separately from the other of the exterior cylinder and the interior cylinder; a spindle portion of the cam follower is coupled with the other of the exterior cylinder and the interior cylinder; and the cylindrical portion and the conical portion of the cam follower protrude from the other of the exterior cylinder and the interior cylinder upon the radial direction.

14. The lens driving device according to claim 9, wherein: the cam follower is formed of a metal, separately from the rotational cylinder; the cylindrical portion of the cam follower is formed from a cylindrical portion that is formed in a unified manner with the other of the exterior cylinder and the interior cylinder; and the spindle portion of the cam follower passes through the cylindrical portion of the cam follower and is coupled with the other of the exterior cylinder and the interior cylinder.

15. The lens driving device according to claim 9, wherein: the cylindrical portion of the cam follower fits with the planar surface portion of the second cam portion and the conical portion of the cam follower is distanced from the cam groove of the first cam portion upon the photography range.

16. The lens driving device according to claim 9, wherein: only the conical portion of the cam follower fits with the taper shaped cam groove of the first cam portion upon the range of the movement from the compressed state to the photography state.

* * * * *